United States Patent
Griffin et al.

(10) Patent No.: US 12,049,859 B2
(45) Date of Patent: Jul. 30, 2024

(54) FUEL INJECTOR SEAL

(71) Applicant: JCB Research, Uttoxeter (GB)

(72) Inventors: John Griffin, Uttoxeter (GB);
Mohammad Saifullah Khan, Uttoxeter (GB); Emma Coates, Uttoxeter (GB)

(73) Assignee: JCB Research, Uttoxeter (GB)

( * ) Notice: Subject to any disclaimer, the term of this patent is extended or adjusted under 35 U.S.C. 154(b) by 0 days.

(21) Appl. No.: 18/224,334

(22) Filed: Jul. 20, 2023

(65) Prior Publication Data
US 2024/0026845 A1   Jan. 25, 2024

(30) Foreign Application Priority Data
Jul. 20, 2022   (GB) ..................... 2210593

(51) Int. Cl.
| F02M 55/00 | (2006.01) |
| F02M 35/10 | (2006.01) |
| F02M 35/104 | (2006.01) |
| F02M 55/02 | (2006.01) |

(52) U.S. Cl.
CPC .... F02M 55/004 (2013.01); F02M 35/10209 (2013.01); F02M 35/104 (2013.01); F02M 55/025 (2013.01); *F02M 2200/856* (2013.01); *F02M 2200/857* (2013.01); *F02M 2200/858* (2013.01)

(58) Field of Classification Search
CPC ........... F02M 55/004; F02M 35/10209; F02M 35/104; F02M 55/025; F02M 2200/856; F02M 2200/857; F02M 2200/858
See application file for complete search history.

(56) References Cited

U.S. PATENT DOCUMENTS

| 5,044,340 A | * | 9/1991 | Robnett | F02M 61/145 |
| | | | | 123/472 |
| 5,680,845 A | * | 10/1997 | Peng | F02M 61/145 |
| | | | | 123/470 |
| 5,682,859 A | * | 11/1997 | Wakeman | F02M 61/145 |
| | | | | 277/910 |
| 2008/0265520 A1 | | 10/2008 | Kurth | |
| 2015/0137460 A1 | | 5/2015 | Tadano et al. | |

(Continued)

FOREIGN PATENT DOCUMENTS

| DE | 202008007478 U1 | 10/2009 |
| EP | 1193392 A1 | 4/2002 |

(Continued)

OTHER PUBLICATIONS

United Kingdom Combined Search and Examination Report under Section 17 and 18(3) for Application No. GB2210593.6, dated Dec. 14, 2022.

(Continued)

*Primary Examiner* — Syed O Hasan
(74) *Attorney, Agent, or Firm* — MARSHALL, GERSTEIN & BORUN LLP

(57) ABSTRACT

An internal combustion engine includes a plurality of cylinders, and a plurality of fuel injectors configured to inject a fuel into a respective cylinder of the plurality cylinders. The fuel injectors are received within a bore in a body of the engine and when in service are movable in relation to the body. A seal surrounds each fuel injector and extends between each injector and a peripheral region of the bore.

21 Claims, 7 Drawing Sheets

(56) References Cited

U.S. PATENT DOCUMENTS

2015/0252766 A1 9/2015 Siewert et al.
2016/0230729 A1 8/2016 Bruestle et al.

FOREIGN PATENT DOCUMENTS

JP       H11173423 A    6/1999
JP       2021143604      9/2021
WO   WO-2021/054385 A1  3/2021

OTHER PUBLICATIONS

United Kingdom Supplementary Disclosure for Application No. GB2210593.6, dated Jan. 13, 2023.
United Kingdom Examination Report under Section 18(3) for Application No. GB2210593.6, dated Dec. 14, 2022.
United Kingdom Search Report under Section 17 for Application No. GB2210593.6, dated Dec. 13, 2022.
Extended European Search Report for EP 231863192.2, dated Nov. 24, 2023.

* cited by examiner

FUEL INJECTOR SEAL

FIELD

The invention relates to a seal for an injector for an internal combustion engine.

BACKGROUND

Internal combustion engines are known in which fuel is supplied to a cylinder of the engine via port fuel injection, in which fuel is injected into an intake manifold upstream of the cylinder. This is in contrast to direct fuel injection, in which fuel is injected directly into the cylinder.

Typically, such intake manifolds include a plurality of intake runners configured to supply a mixture of fuel and air into a cylinder head of the engine, from where it is supplied to the engine's cylinders for combustion. Fuel injectors are arranged to inject fuel into the intake runners.

It is known to supply fuel to the plurality of fuel injectors via a common fuel rail. A problem with such an assembly of an intake manifold, fuel injectors and a fuel rail is that the fuel rail can be difficult to assemble when manufacturing the engine or access for maintenance and inspection when the engine is mounted in a vehicle. Moreover, it is common for such intake assemblies to require a large amount of space in the vehicle within which they are mounted due to their shape and size.

The applicant's co-pending UK patent application number 2209322.3, which is incorporated herein by reference, provides an intake assembly for an internal combustion engine, comprising: an intake manifold including a first plenum and a plurality of intake runners, the first plenum comprising an air supply inlet, the intake runners configured to be couplable to a cylinder head of the engine for supplying an air-fuel mixture thereto, the intake manifold configured such that, in use, air is supplied from the air supply inlet to the intake runners via the first plenum. A plurality of fuel injectors, each arranged to inject a fuel into one of the intake runners, are attached to a fuel rail which is mountable to the first plenum.

By mounting the fuel rail to the first plenum of the intake manifold it allows the intake manifold, the fuel rail and the fuel injectors to be preassembled separately which reduces the time and complexity of assembling the engine. Moreover, since the first plenum may be spaced more from the cylinder head of the engine relative to the intake runners for example, in use, the first plenum, and thus the fuel rail, may be easier to access than other portions of the intake manifold to help simplify assembly, inspection or maintenance of the fuel rail.

However, providing a pre-assembled fuel injection system may present alignment problems with the injectors and injector bores in which they are received in the intake runners. The present invention seeks to address the alignment issues.

SUMMARY OF INVENTION

The present invention provides an internal combustion engine and method of assembling an intake assembly according to the appended claims.

The present disclosure provides an internal combustion engine comprising: a plurality of cylinders; a plurality of fuel injectors configured to inject a fuel into a respective cylinder of the plurality cylinders, wherein the fuel injectors are received within a bore in a body of the engine; a seal surrounding each injector and extending between each injector and a peripheral region of the bore.

The present disclosure provides an intake assembly comprising a fuel injector configured to inject a fuel into a cylinder of an internal combustion engine. The fuel injectors may be received within a bore in a manifold of the intake assembly. A seal may surround each injector and extend between each injector and a peripheral region of the bore.

The present disclosure provides a seal for sealing between a fuel injector and a body of an air intake manifold of an internal combustion engine.

The seal may comprise a radial portion and an axial portion. The radial portion may comprise a central aperture for receiving the injector. The axial portion may extend from the radial portion to the body. The seal may comprise an inverted cup shape.

The body may comprise a manifold of an air intake assembly. The body may comprise an air intake runner of an air intake manifold.

The body may comprise one or more sealing features on the periphery of the bore. The sealing features may be configured to mate with or abut the seal. The sealing feature comprises an annular recess which surrounds the bore. The annular recess may be provided at the peripheral region of the bore and may comprise an extension of the injector bore.

The annular recess may receive a rim of the seal. The annular recess may comprise a base and a sidewall. The seal may engage with either or both of the base or sidewall.

The annular recess may comprises a drain to allow fluid to exit the recess. The drain may comprise a drainage channel. The drain may comprise an opening in the base wall and/or side wall of the recess. The opening may be an aperture in the form of a bore, or a notch. The annular recess may be provided at an edge of a horizontal surface so as to extend beyond the surface and be open sided.

The central aperture of the seal which receives the injector may be defined by a collar which is configured to resist deformation when being urged over the fuel injector. The collar may comprise an axial length greater than 3 mm and a radial width greater than 2.5 mm. The collar may have an axial length between 3 mm and 8 mm, preferably between 3 mm and 6 mm, more preferably between 3.5 mm and 5.5 mm more preferably between 3.5 mm and 4.5 mm. The radial width of the collar may be between 2.5 mm and 5 mm, preferably between 3 mm and 4 mm, for example. The wall thickness of the main body of the seal may be between 1.5 mm and 4 mm. Preferably, between 2 mm and 3 mm.

The seal may be axially and radially resiliently deformable. The resilient deformation provided by the seals may be sufficient to allow for positional inaccuracies which occur between the respective injector bores and injectors of an intake assembly. The misalignment of injector bores and injectors may be less than 2 mm for each respective injector/bore pair and may be less than one millimetre. The misalignment may be between 0.25 mm and 1 mm.

The seals may be single use seals. The seals may be replaced during regular servicing intervals.

The internal combustion engine, intake assembly or seal, may further comprise a retention member configured to limit axial movement of the seal along the injector. The retention member may abut an upper surface of the seal. The injector may pass through the retention member. The retention member may engage with a plurality of seals.

The retention member may be attached to the engine independently of the seals and injectors.

The internal combustion engine or intake runners may be comprise a rigid fuel rail. The injectors may be in flow communication with the rigid fuel rail. The retention member may be attached to the fuel rail.

The seal may comprise a seal collar which sealably mates with the injector and a rim which sealably contacts the body. The seal may be comprise a main body extending between the seal collar and the sealing portion which engages with the body (e.g. the manifold).

The fuel injector may be configured to inject a gaseous fuel, optionally hydrogen or compressed natural gas.

The internal combustion engine or intake runners may comprise a fuel rail to which the injectors are mounted. The injectors, fuel rail and seals may comprise a sub-assembly which is mounted to the manifold.

The present disclosure may comprise a vehicle comprising the internal combustion engine or intake assembly as described herein. The vehicle may be an off-highway vehicle and/or working machine. The invention may also be applicable to non-vehicular applications such as an engine provided in a genset, for example.

The present disclosure provides a method of assembling an intake assembly for an internal combustion engine, comprising: attaching a plurality of fuel injectors to a fuel rail; providing a seal around each of the plurality of fuel injectors; mounting the fuel injectors into an injection bore of an air intake manifold and positioning each seal between each respective fuel injector and injection bore thereby sealing the injection bore to prevent ingress of foreign matter.

The method may further comprise: attaching, prior to providing the seals, a retention member to the fuel rail or fuel injectors, the retention member being positioned relative to the fuel injector tip to locate the seal.

The skilled person will appreciate that except where mutually exclusive, a feature described in relation to any one of the aspects, embodiments or examples described herein may be applied mutatis mutandis to any other aspect, embodiment or example. Furthermore, except where mutually exclusive, any feature described herein may be applied to any aspect and/or combined with any other feature described herein.

BRIEF DESCRIPTION OF DRAWINGS

Embodiments will now be described by way of example only with reference to the accompanying figures, in which.

DETAILED DESCRIPTION

Figure 1:
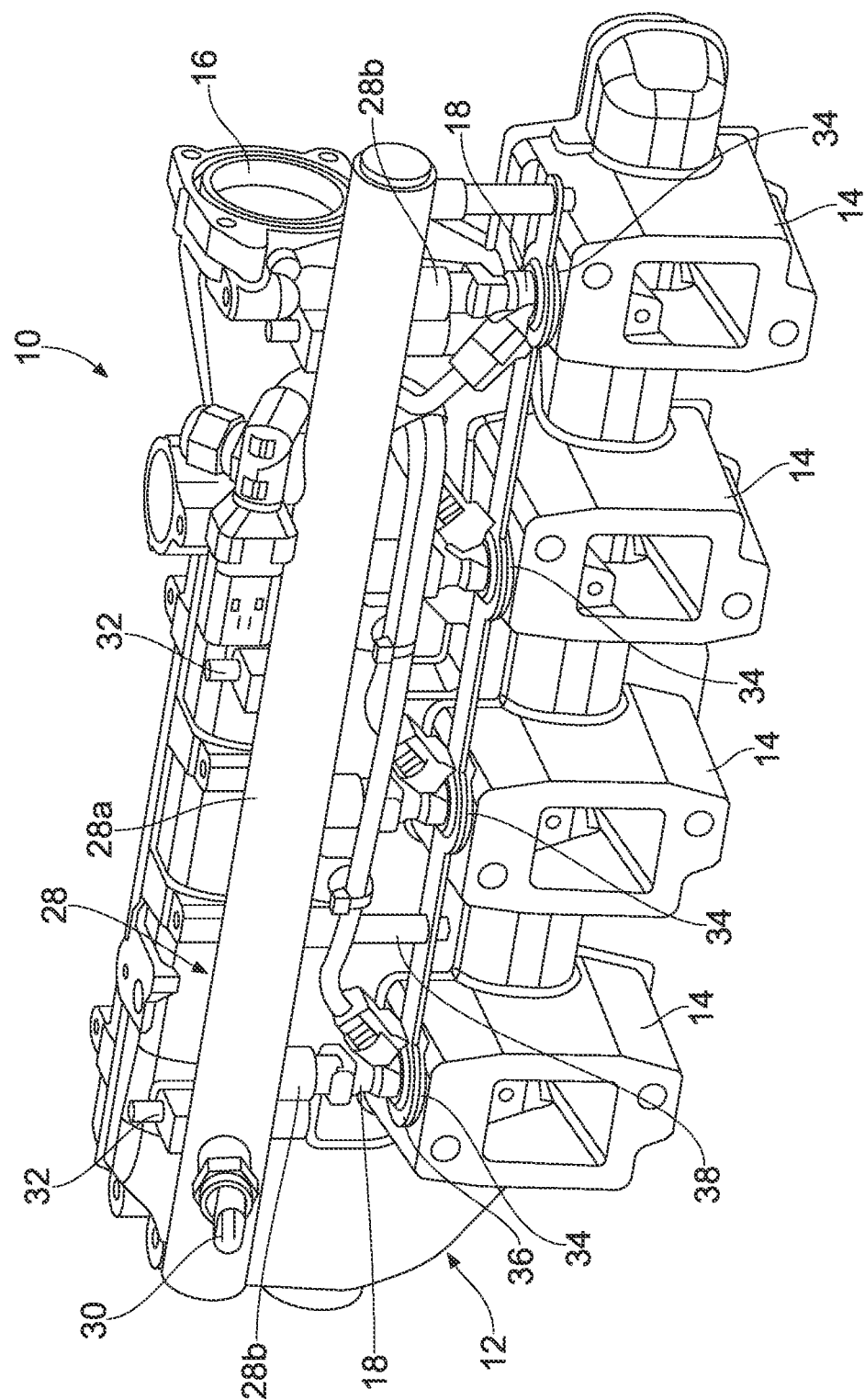
FIG. 1 shows a perspective view of an internal combustion engine comprising injector seals arrangement according to the present invention.

In the following detailed description, numerous specific details are set forth in order to provide a thorough understanding of various embodiments and the inventive concept(s). However, those skilled in the art will understand that: the present invention may be practiced without these specific details or with known equivalents of these specific details; that the present invention is not limited to the described embodiments; and, that the present invention may be practiced in a variety of alternative embodiments. It will also be appreciated that well known methods, procedures, components, and systems may have not been described in detail.

Throughout this disclosure references to axial and radial may be taken with reference to the longitudinal axis of the injectors unless otherwise stated.

The present disclosure provides numerous embodiments of an injector seal arrangement for an internal combustion engine. The seal arrangement is primarily for injectors which are mounted within an injector bore. The injectors may be preassembled to a fuel delivery system which is subsequently mounted to an air intake manifold. However, it will be appreciated that the injector seals maybe utilised in any internal combustion engine where there is a need to prevent foreign matter entering the injector bore around the injectors.

Throughout the present disclosure, references to foreign matter may comprise particulate matter such as dirt, dust, chaff, chippings, and/or fluids such as liquids e.g. water, fuel or oil, which may be experienced in service.

In instances where the fuel assembly is pre-assembled, there can be alignment issues in which the injector axes are each offset relative to the injector bores, possibly in different directions and by different amounts. This can be due to normal manufacturing tolerances and may be particularly notable when one or more components are cast, for example. One way to overcome this is issue is to allow some relative movement between the injectors and the air intake manifold during assembly. However, this can be difficult with a threaded engagement between the bore and the injector.

The present disclosure uses floating injectors which are located within the respective bores using a suitable seal, such as an o-ring, which is sealably received within the bore but allows a degree of axial, radial and rotational movement to accommodate any misalignments. However, in providing a floating injector which is sealed in this way, the mouth of the injector bore is left open and can provide a recess in which foreign matter can collect. This can cause in-service issues and also issues when the injectors are removed for maintenance or repair which can result in the contents of the well falling directly into the air intake manifold, particularly if the injector areas are not cleaned prior to removing the seals and injectors.

As will be appreciated, the present disclosure is particularly useful for dirty environments such as those experienced by off-highway work machines. Work machines may be used in various industries to excavate material and/or transport or move material over a surface. Such machines may include, construction and agricultural equipment such as, for example, backhoe loaders, slew excavators, material handlers, telescopic handlers, wheeled loader shovels, forklifts, skid-steer loaders, etc and, although predominantly intended for off-highway use, may be suitable for road use to allow for moving between worksites, for example. Such machines may be subjected to various levels of dirt and dust which can enter the engine compartment and potentially deposit material on and around the injectors, thereby restricting movement of the injectors and/or making removal of the injectors more problematic.

The present disclosure addresses these issues by providing an injector seal which surrounds an injector on an external side of an injector bore thereby helping to prevent foreign matter entering the injector.

The seals may be generally annular and comprise a central passageway in which the injector is sealably received. The seals extend radially from the injector to a peripheral region of the bore thereby covering the interface and immediate vicinity around the injector and bore in which it is received.

The seal arrangements of the present disclosure are generally aimed at internal combustion engines, ICEs. The ICEs may be configured to be powered by a gaseous fuel, such as hydrogen, compressed natural gas (CNG), landfill gas or the like. In alternative embodiments, the ICEs may be configured to be powered by liquid fuels such as petroleum or diesel for example, or by a combination of liquid and gaseous fuels. However, it will be appreciated that the injectors used in such engines may be fixedly mounted and provided with an integral seal meaning the use of an additional sealing arrangement is redundant. The ICEs will typically have a plurality of cylinders, e.g. 2, 3, 4, 6, or 8.

The injectors may be part of a port fuel injection, PFI, system in which the fuel is injected into an air supply upstream of a cylinder, or a direct injection in which fuel is injected directly into the cylinder.

FIG. 1 shows an air intake assembly for a port fuel injection, PFI, system comprising an intake manifold to which a plurality of injectors are mounted for injecting fuel into the airstream upstream of respective cylinders. The injectors are shown schematically in cross-section in FIG. 2 as being mounted in an injector bore in a wall of the intake manifold and have an annular seal extending radially between the injector and a peripheral region of the bore.

As noted above, the injectors may be configured to allow limited relative movement when being located in the injector bores. The movement may be axial, radial or torsional/rotational. It will be appreciated that, although the primary embodiment relates to a PFI system, the inventive concepts disclosed herein may relate to other types of injection system such as a direct injection system in which fuel is injected directly into the cylinders of the engine. As such, in some embodiments, the fuel injectors may be received in a body in the form of a manifold, cylinder head or some other appropriate part of the engine or fuel injection system. As such, the term body is used within this disclosure to denote member in which the injectors are mounted. In the described embodiment, the body is an air intake manifold, in particular, an intake runner of the manifold, but other locations may be possible in other embodiments.

Figure 5A:
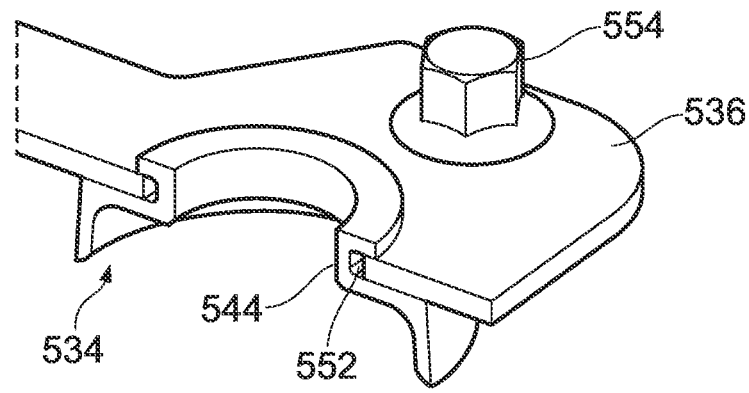
FIGS. 5a and 5b show a perspective view of a seal with a retention member and the seal and retention member in section respectively.
Figure 5B:
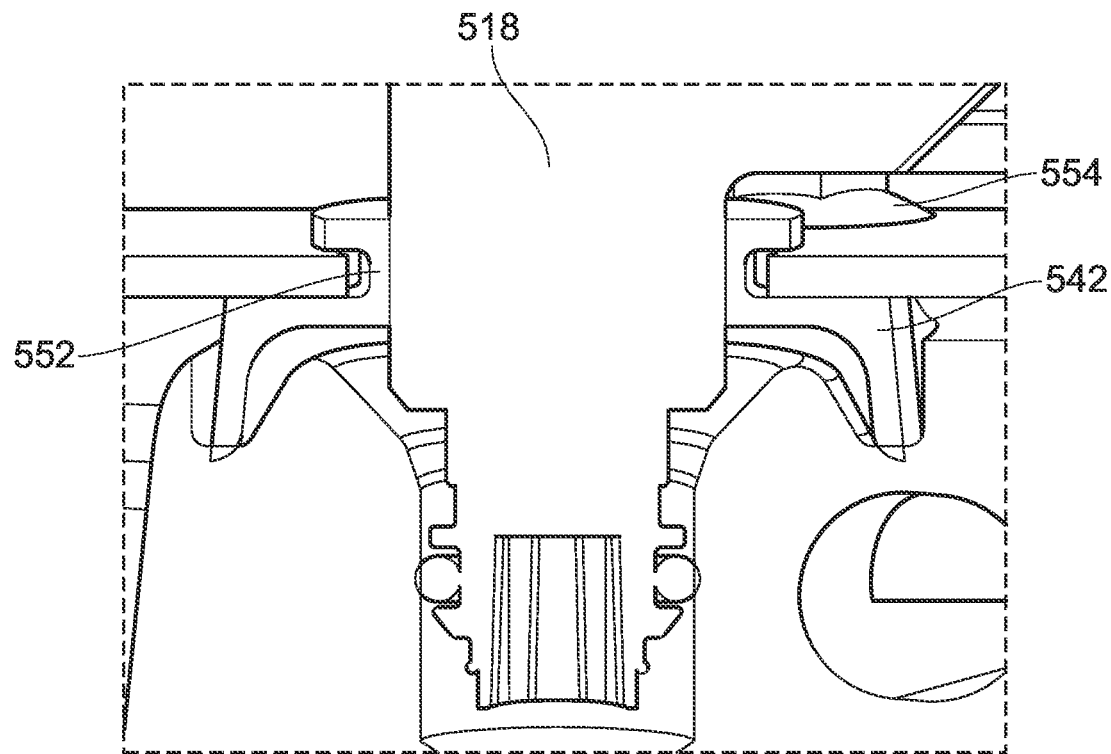
Figure 6:
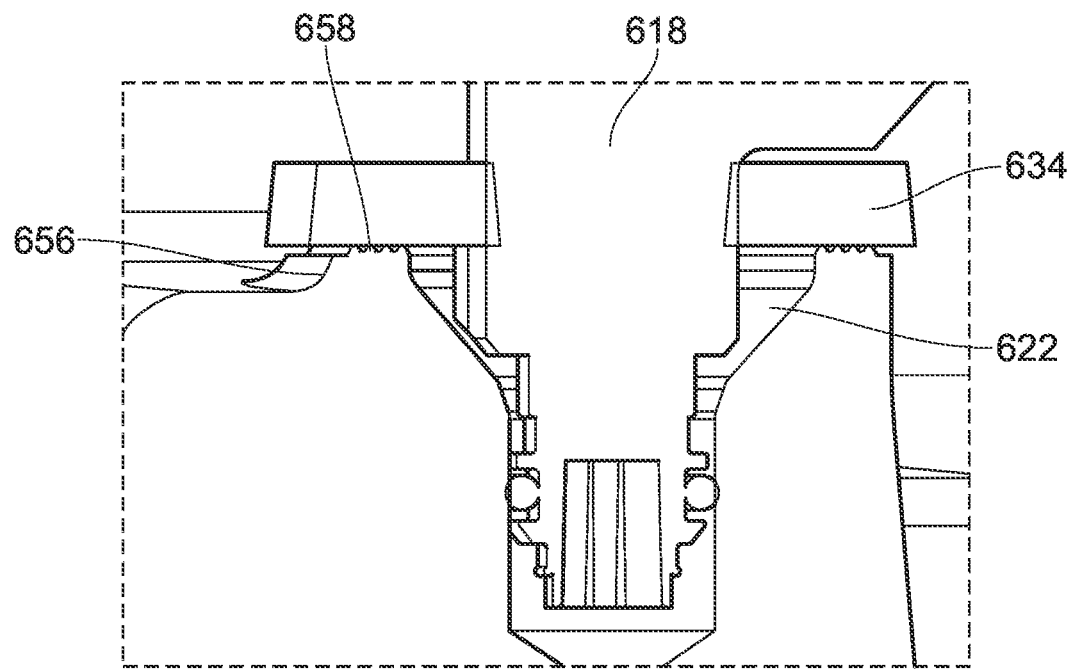
FIG. 6 shows a yet further alternative seal arrangement in section.

The seal may take any suitable shape which can provide the required seal across the connecting interface between the injector and body in which it is mounted. The seal will generally comprise a radial component so that the gap between the seal and a periphery of the bore can be bridged, but may also include an axial component. FIGS. 6 and 7 show seals which extend in the radial direction only, whereas FIGS. 2, 3, 4, 5 and 8 show seals which extend radially and axially. The seals may be described as 'cup-shaped' in some embodiments in which a "base" of the cup is uppermost and extends radially outwards from the injector, and wall of the cup-shape extends axially downwards to meet the body in which the injector is mounted. As such, the seal may enclose a volume around the injector and covering the injector bore.

A sealing interface between the seal and the body may comprise a direct contact between a distal edge or edge portion of the seal. In some embodiments of the present disclosure, the edge may comprise a rim of the seal which is distal to the injector. The rim may be received on a sealing surface of the manifold which may be within a recess such as an annular trough, as shown in the examples of FIGS. 2, 3, 4, 5b, and 8c.

In embodiments of the present disclosure where the seal is received within a recess, the recess may act as a reservoir for the collection of foreign matter. To address this, the recess may include a drainage channel to allow water and/or dirt to exit the recess. The drainage channel may comprise an aperture, such as a hole or notch, provided in a wall of the recess, for example.

In some embodiments of the present disclosure, the edge portion of the seal may comprise a side surface of the seal which contacts a sealing surface provided on a local elevation, e.g. a boss, of the manifold as shown in FIGS. 6 and 7, or the sidewall of the recess.

Surface sealing features may be provided between the seal and the body. The sealing feature may comprise the recess or a local elevation of the body and/or on the seal to improve the seal. The sealing features may be provided on an uppermost surface of the local elevation which is contacted by the seal, for example. The sealing features may comprise a sidewall or base of the recess or may comprise surface features such as a plurality of annular ribs or grooves as shown in FIG. 6. The sealing surface features may comprise any surface feature, contouring or coating which aids the sealing interface.

It will be appreciated that in some embodiments of the present disclosure, the sealing surface may be provided flush with the surrounding manifold area, that is, not on a local elevation or within a recess. The use of a local elevation allows water which contacts the exterior side of the seal to run off and away from the seal and sealing interface with the body. Further, the seal may overhang the local elevation to further aid the removal of water from the sealing surface.

The seal may be snugly received over the injector so as to provide a closely coupled sealing interface. Hence, in some embodiments, the seal may be sized to provide friction fit over the injector and may comprise a central bore which has a smaller diameter than the corresponding external diameter of the injector. The seal may comprise a resiliently deformable material such that it may deform and/or expand around the injector when being fitted to provide a compression fit. The material may be any suitable material as known in the art. The material may comprise rubber, for example. The rubber may comprise hydrogenated nitrile butadiene rubber, HNBR, which is well known in the art for engine seals and gaskets and has a composition which can be varied for different applications and material properties in terms of resilience etc.

The edge or edge portion of the seal may be urged into contact with the sealing surface of the body and may be resiliently deformable to provide a good sealing interface. Additionally, the geometry of the sealing edge may lend itself to providing a good sealing contact. For example, the rim of the seal may comprise a tapered portion which is readily deformable when biased against the sealing surface allowing it to deflect and conform to the body upon contact.

In the cases where the seal is resiliently deformable, the central injector receiving aperture may be provided with a semi-rigid construction to avoid being deleteriously deformed when being fitted over the injector. As such, as can be seen in FIGS. 2, 3 and 5, the central aperture may be provided with a collar having an increased radial width, axial length or cross-sectional area compared to a wall portion of the seal. As such that the collar is provided with increased stiffness for insertion of the injector and can be fitted over the wider injector body whilst maintaining the annular sealing surface without losing shape. This might be contrasted to the arrangement shown in FIG. 3 where the seal/injector interface is provided by a tapered surface. This surface may require less force to sealably receive the injector and be more compliant, but may inadvertently be subjected to axial deformation around a circumferential portion when receiving the injector, thereby impairing the sealing performance. That is, the sealing edge may inadvertently roll when receiving the injector. Such a deformation may be especially problematic if overlooked during installation and assembly of the air-fuel system or engine.

The injection receiving aperture may be smaller than the injector prior to installation to ensure a tight fit is achieved. The extent of the undersize may be varied according to the seal dimensions and chosen material.

As will be appreciated, the seals may be under the influence of various forces in use which can cause the seals to move over extended periods of use resulting in a breakdown or impairment of the sealing efficacy. The movement of the seals may be caused by normal or abnormal vibrations in service or the relative movement of the injectors and the manifold. Further, the seals may be accidentally disturbed during maintenance of the engine or fuel system following an initial installation.

As such, some embodiments of the present disclosure may be provided with one or more retention members to help prevent movement of the seals during or following installation. The retention member may be configured to prevent axial movement of the seal thereby preventing separation or a breakdown of the sealing surface at the seal/manifold interface.

In some embodiments, the presence of the retention member may additionally aid assembly of the injector assembly and ensure that the seals are installed properly. More specifically, the seals and retention members may be attached to the injectors prior to the injectors being inserted into the injector bores. In doing so, the correct mounting of the seals on the injectors can be assured and their relative position maintained when the injectors are inserted. This may be particularly useful where the entry point of one or more of the injectors is obscured following assembly.

The retention member may comprise a relatively rigid body which sits at least partially around the seal and/or above (that is, axially distal to the body) the seal to prevent axial movement away from the body. The retention member may comprise a body in the form of a plate. The plate may comprise an aperture sized to receive the injector and, optionally, a portion of the seal. The aperture may be a closed aperture into which the injector must be inserted during assembly.

There may be a separate retention member per seal, or a common retention member connected to a plurality of seals.

The retention member may be attached to the air intake assembly or fuel assembly at any suitable location. In some embodiments, the attachment point is provided on the manifold and may be provided local to the seal. Examples of this are provided in FIGS. 5a and 7a-c in which an attachment point in the form of a bolted connection is provided adjacent to each injector. In some embodiments of the present disclosure, the retention member may be attached to the injector itself, or a fuel line of the injector thereby allowing an injector assembly including the seals and retention member assembled prior to it being mounted and attached to the manifold. Such an arrangement is shown in FIG. 1 where the retention member is mounted off the fuel rail to which the injectors are connected and receive fuel from.

As noted, the retention member may be configured to reduce or prevent vertical movement of the seal. As such, the retention member may be located on an axially outer surface of the seal with a radial overlap such that at least a portion of the seal is located between the retention member and manifold.

The seal may be independently attached to the retention member such that the seals can be mounted to the retention member to provide a sub-assembly prior to being mounted to the injectors. Such an arrangement is shown in FIGS. 5a and 5b where the retention member is received within a collar of the seal which is resiliently deformable to receive the seal during assembly.

In some embodiments, the seal may engage directly with the injector to prevent axial movement beyond a predetermined location. The engagement may be provided through contact of a radially extending feature of the injector such as a projecting body, lip, shoulder or other feature. The projecting body may provide or house an electrical connector for example. The shoulder may be provided between changes in the external diameter of the injector, for example.

The seal and/or retention member may extend radially beyond the sealing surface of the manifold to provide an overhang or canopy. Providing an overhang in this way helps shield the sealing surface from fluid (e.g. water) run-off which is directed away from the sealing surface. Examples of an overhang can be seen in FIGS. 2, 5a,b, 6 and 7a-c.

Figure 8A:
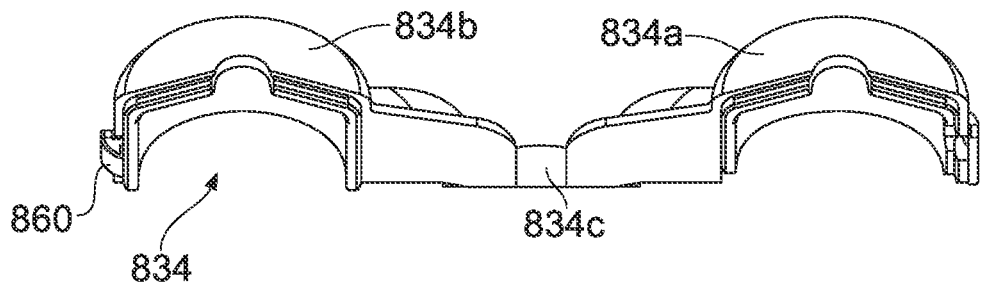
FIGS. 8a to 8c show a two-part seal in an expanded configuration, a closed configuration and in section, respectively.

The seals may comprise a single piece construction in which the central injector receiving aperture is provided in a unitary body via an aperture defined by a continuous unbroken edge within the unitary body. In some embodiments, the seal may comprise a multi-part construction in which separate parts attached to provide an assembled seal. The multi-part seal may comprise a first part and a second part which are coupled together to provide a complete seal. The first part and second part may each define a portion of the central aperture which receives the injector such that the seal is formed around the injector when parts are coupled together. The first and second parts may be hingedly connected in some embodiments of the present disclosure for ease of aligning and coupling the parts together. The coupling of the parts may comprise a latch, clasp, clamp, or other similar attachment mechanism. FIGS. 8a,b show an example of a two part seal. It will be appreciated that in some embodiments a multi-part seal may comprise more than two parts. A multi-part seal may comprise a known material which is substantially rigid to maintain its shape prior to and after assembly.

In more detail, with reference to FIG. 1, there is shown an intake assembly 10 which includes an intake manifold 12. The intake manifold 12 may include a plurality of intake runners 14 and an air supply inlet 16. The intake runners 14 are configured to be couplable to a cylinder head (not shown) for supplying an air-fuel mixture to intake ports of the cylinder. The intake manifold 12 is configured so that air is supplied from the air supply inlet to the intake runners 14.

The intake assembly 10 further includes a plurality of fuel injectors 18, one for each of the four cylinders. Each fuel injector 18 includes an injector tip arranged to open and close and selectively inject a fuel into one of the intake runners 14 with appropriate timing for the combustion cycle in the respective cylinder.

With additional reference to FIG. 3, each fuel injector tip 20 is received in a respective injector bore 22 provided in the intake manifold 12, specifically, in a wall of the intake runner 14. Each injector bore 22 is in fluid communication with an internal passage of the corresponding intake runner 14 to allow fuel to be injected into the air flow and may comprise tapered inlet 24. Each of the fuel injector tip 22 has a width which is narrower than a preceding body portion and comprises a seal 26 in the form of an O-ring which contacts and seals against the internal surface of the injector bore 22. A shoulder 20a provided between the injector tip 20 and wide body portion resides within the tapered portion of the inlet.

The bore 22 may be located in an area of the manifold 12 which is substantially planar although one or more surface features such as a raised boss or trough may be provided in the vicinity of the bore 22. The bore 22 may be located in an upper surface of the intake runner 14.

It will be appreciated that the arrangement of the bore 22 and injector tip 20 may be common to each of the embodiments provided in the present disclosure.

The intake assembly 10 may further include a fuel rail 28 coupled to the plurality of fuel injectors 18. The fuel rail 28 includes a fuel supply inlet 30 and is configured to supply fuel from the fuel supply inlet to the plurality of fuel injectors 18. The fuel rail 28 may be configured to supply a gaseous fuel, such as hydrogen, to the fuel injectors 18 although other fuels may be used in other embodiments.

The fuel rail 28 shown in FIG. 1 includes an elongate supply conduit 28a and a plurality of supply channels 28b extending from the supply conduit to the fuel injectors 18 for supplying fuel from the fuel supply inlet to the respective fuel injector via the supply conduit.

The fuel rail 28 and the fuel injectors 18 are configured such that the fuel injectors 18 are mountable to the fuel rail 28 prior to the mounting of the fuel rail 28 to the manifold 12. Each fuel injector 18 is mounted to the respective supply channel via a mounting arrangement. In this embodiment, the mounting arrangement includes a suitable clip. Advantageously, such a configuration enables the fuel rail 28 and the fuel injectors 18 to be preassembled separately to the remainder of the intake assembly 10, which reduces the time and complexity of assembling the intake assembly 10. In other embodiments the fuel injectors 18 may be mounted to the fuel rail 28 via a screw fitting, bayonet fitting, press-fitting or the like.

In the illustrated embodiment, the fuel rail 28 is removably mounted to the manifold 12 via a plurality of brackets 32 attached to the fuel rail 28. The brackets 32 are spaced from each other along a longitudinal axis of the fuel rail 28. In alternative embodiments (not shown), the fuel rail 28 may be mounted to the manifold via a single bracket attached to the fuel rail. Each bracket is removably secured to a first plenum of the intake manifold 12 via a mechanical fastener such as a threaded stud and nut.

Surrounding each of the injectors 18 is a seal 34. The seal 34 may comprise any of the seals provided within the present disclosure, as described in further detail in connection with FIGS. 2 to 8 below.

Also shown is an optional retention member 36 which engages with the seals 34 to prevent axial movement of the seal 34 and to aid with positioning the seals 34 during assembly. The retention member 36 shown in FIG. 1 appends from the fuel rail 28 via a plurality of supporting arms 38 which extend from the fuel rail 28, specifically from the supply conduit 28a. The supporting arms 38 extend generally parallel to the axis of the injectors 18 and terminate in line with the seals 34 which is the height the retention member is presented.

Figure 7A:
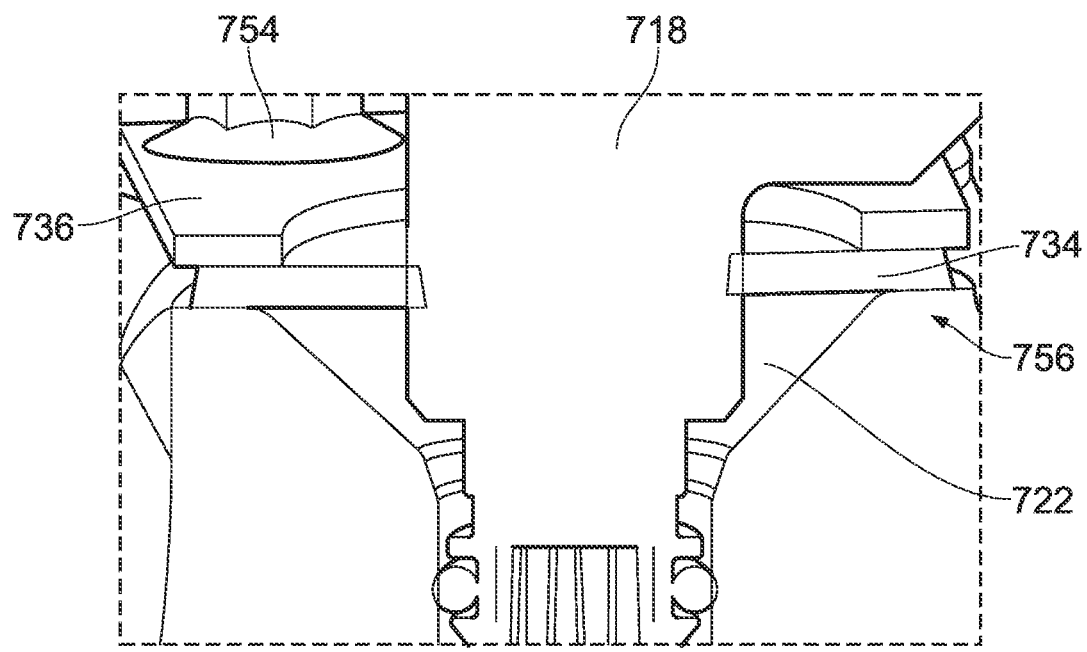
FIGS. 7a to 7c show a still yet further alternative seal arrangement in section and perspective views, respectively.
Figure 7B:
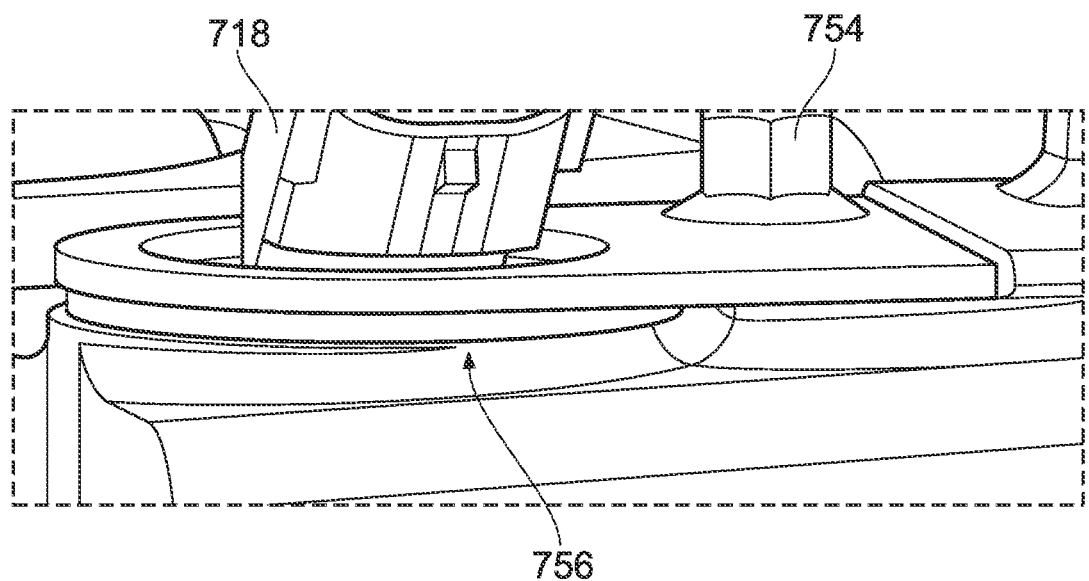

As shown, the retention member 36 may be generally planar and comprise a plate-like member. In the example shown, the retention member 36 extends between all of the injector seals 34 although this is not a requirement and there may be a plurality of discrete retention members as shown in FIGS. 7a and 7b which is discussed further below. As such, the retention member for each of the seals 34 may be linked to the adjacent neighbouring retention member(s) via a bridging portion which, in the described embodiment is an elongate member which extends between opposing edge regions of the individual retention members. Herein the term "retention member" may be taken to mean either a portion of the global retention member which engages with an individual seal 34, rather than the retention member as a whole and as shown in FIG. 1.

The retention member 36 may be fixed in relation to the manifold 12 such that axial movement is substantially avoided in service. The retention member 36 may be fixedly attached to the manifold 12, the air runner 14, the injector 18, the fuel rail 28 or elsewhere, with the embodiment shown in FIG. 1 being suspended below the fuel line on a plurality of arms 38 as described previously. It will be appreciated that the number and location of the arms 38 may be varied in accordance with the geometry and rigidity of the retention member 36.

Figure 2A:
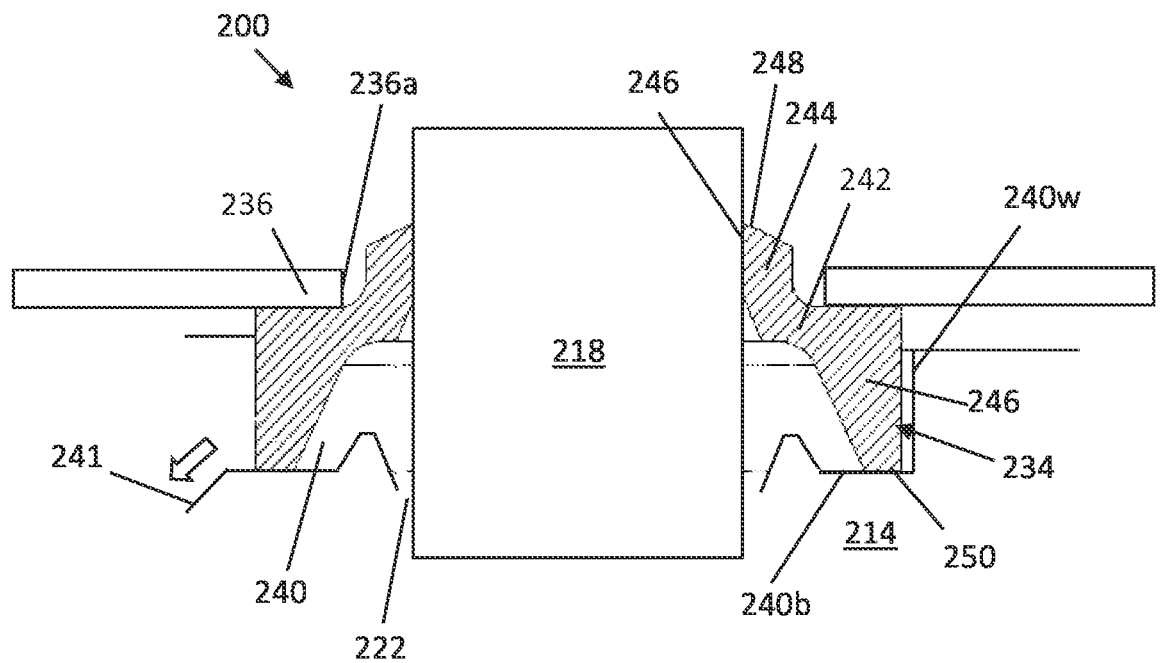
FIGS. 2a and 2b show a section view of a seal arrangement having a seal mounted around an injector in an injector borehole and a perspective view of a seal respectively.
Figure 2B:
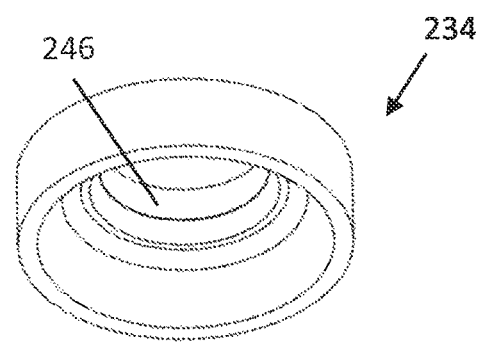
Figure 3:
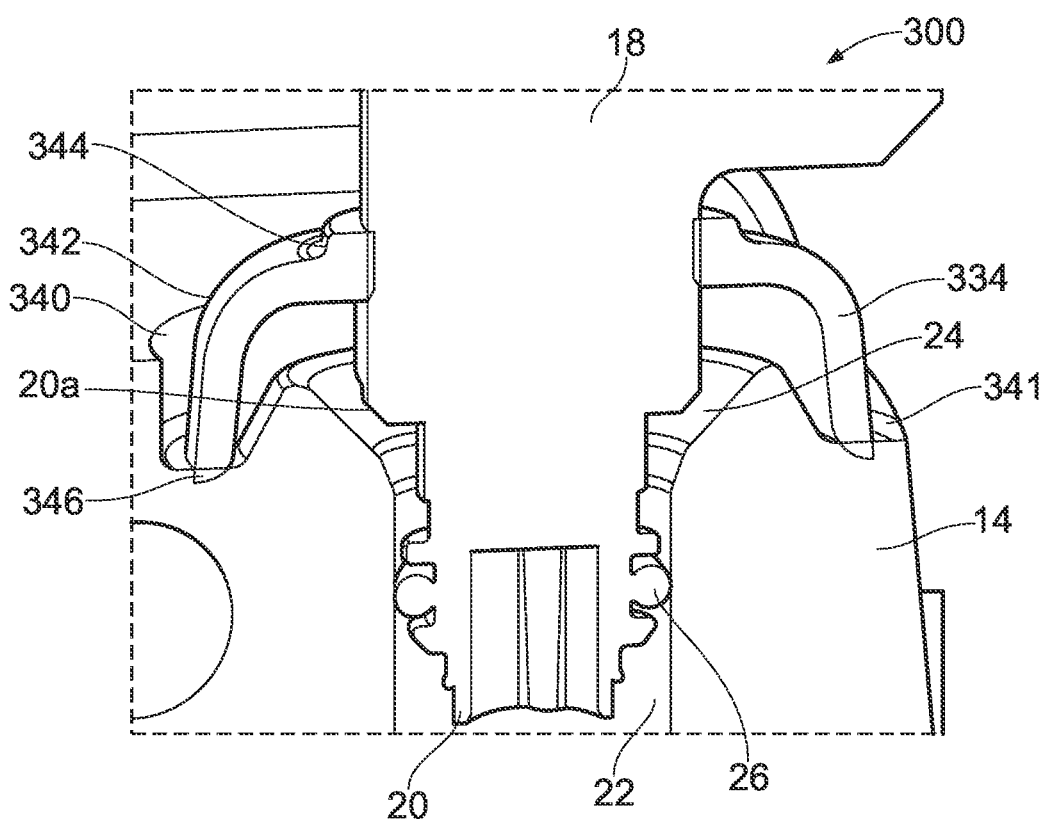
FIG. 3 shows an alternative seal arrangement in section.

Turning now to FIGS. 2a to 8b, FIGS. 2a and 2b show an injector seal arrangement 200 an seal 246 in cross-section and perspective views respectively. The seal arrangement 200 may be used within the intake assembly of FIG. 1 or elsewhere. The seal arrangement 200 comprises a seal 234 surrounding an injector tip 220 which is received in a bore 222 of an intake runner 214 of which only a portion is shown. The seal 234 is held captive by the retention member 236 to prevent axial movement. A distal rim of the seal 234 is located within a recess 240 provided in the intake runner 214. As can be seen in FIG. 2b, the seal 234 is generally annular so as to encircle the injector 218 around an external diameter thereof. It will be appreciated that FIG. 2b is a schematic representation of a seal arrangement 200 with some features, such as the lower portions of the bore 222 and the injector o-ring (shown in FIG. 3 at 26) omitted.

The seal 234 may comprise a body 242 which extends between the injector 218 and intake runner 214. The body 242 may terminate in an injector seal portion 244 which engages with the injector 234, and an intake runner portion 246 which engages with the intake runner 214. As noted previously, the intake runner portion 246 may be more generally referred to as a manifold portion or body engaging portion when the injector bore 222 is provided elsewhere in an air/fuel delivery system or cylinder, for example.

The injector seal portion 244 is defined by a central aperture 246 in which the injector 218 is snugly received so as to provide a sealing contact. The injector seal portion 244 of FIG. 2a comprises a collar which is generally resilient to deformation when being mated with the main body of the injector 218 whilst being sufficiently compliant to provide a suitable sealing contact. The resilience may be achieved with suitable geometry of the sealing portion and/or with a suitable selection of material properties, as known in the art.

In terms of geometry, the collar may comprise an increased cross-sectional area when compared with the body 242 which is required to flex to accommodate movement between the fuel injector 218 and manifold 214 during assembly. In the embodiment of FIG. 2a, the injector seal portion 244, i.e. collar, comprises a generally cylindrical portion of wall which encircles and extends along the injector 218. The axial length of the cylindrical wall portion is greater than the radial width (by a factor of approximately 2, for example), thereby providing axial rigidity to avoid deformation during assembly.

The specific size of the collar will vary between applications and in accordance with the material choice. However, it is envisaged that a collar size have an axial length between 3 mm and 8 mm, preferably between 3 mm and 6 mm, more preferably between 3.5 mm and 5.5 mm more preferably between 3.5 mm and 4.5 mm. The radial width of the collar may be between 2.5 mm and 5 mm, preferably between 3 mm and 4 mm for example. It will be appreciated that having an increased axial length relative to the radial width may be advantageous as it increases the sealing surface interface with the injector, but this is not a limitation and the radial and axial dimensions of the collar may be similar or the latter may be smaller in some embodiments.

An upper surface 248 of the collar may comprise a taper of frustoconical profile such that the surface which extends away from the injectors has a camber to encourage fluid run-off. A radially inner lower-most edge of the collar may also comprise a taper when viewed in section to help improve the conformability of the seal 240 at the connection with the body 242.

The main body 242 of the seal may take any suitable form to allow the necessary flexion in the seal 234. In the example shown in FIG. 2, the main body 242 comprises a bridge which extends between the collar 244 and the injector seal portion 246.

The intake runner seal portion 246 is provided lowermost on the seal 234 and engages with the intake runner 214 at a seal/manifold sealing surface 250. The seal portion 246 may take any suitable form provided it mates with the sealing surface 250. In the example shown, the seal portion 246 comprises a flange or skirt member which extends radially outwards and downwards from the main body 242. In some embodiments, the manifold seal portion 246 may comprise an edge surface of the main body 242 and may be configured to deform both axially and radially as is the case in FIGS. 3 and 4, for example.

A peripheral edge region of the fuel injector bore 222 provides the sealing surface 250 against which the seal 234 is engaged so as to isolate the bore 222 to prevent ingress of foreign matter with a recess 240. Generally, the recess 240 may be provided at a periphery of the bore 222 and may be provided as a continuation of the bore 222 in some embodiments. As shown, the recess 240 may be provided by an annular trough which encircles the bore 222 and comprises a base 240b and at least one side wall 240w extending upwardly from the base 240b. The seal 234 may contact either or both of the side wall 240w and base 240b which may be considered to be sealing surfaces.

Although not shown in FIG. 2a, the sealing surface(s) of may include one or more features, treatments or coatings to improve the sealing contact of the seal 234.

To enable fluid to flow out of the recess 240, there may be an opening 241 in the sidewall 240w. The opening may be provided by a notch or aperture in the sidewall 240w or base 240b. The opening may advantageously be provided by locating the recess adjacent to an edge of the intake runner 214 such that the recess extends beyond the surface of the intake runner and is effectively open sided. That is, the radius of the recess 234 may be greater than the separation between the centre of the recess 234 and the edge of the intake runner 214. With this arrangement, fluid entering the recess 234 from the external surface of the seal 218 or otherwise may be able to flow out of the recess 234 and down the side surface of the intake runner 214, away from the sealing surface. Having a drain may be particularly advantageous where the intake assembly is cleaned prior to removing the injector for maintenance or servicing for example, as it allows foreign matter to be readily flushed out of the recess and away from the injector bore 222.

The recess 240 in FIG. 2a is defined within an external surface of the manifold intake runner 214 around a peripheral region of the bore. In the present example, the recess 240 comprises an extension of the injector bore 222 but this is not a limitation and the recess may be separate from the bore. The profile of the bore 222 and recess 240 may be conveniently formed with a common tool, e.g. a boring or milling tool, in a single cutting operation. The bore 222 and recess 240 may be partly partitioned by an annular stub wall which extends upwardly with respect to the base 240b. The stub wall may have a reduced height compared to the outer recess sidewall thereby allowing the seal to sit lower against the injector 216.

As noted, the retention member 236 acts to restrict the axial movement of the seal 234 away from the bore and along the injector 218, thereby ensuring that the seal 234 at the intake runner sealing surface 250 is maintained.

The retention member 236 comprises a central aperture 236a through which the injector 218 and seal 234 partially extend. The central aperture 236a may be any shape and size to provide a contact between the retention member 236 and seal 234 to prevent the axial movement. In the embodiment shown, the central aperture 236a is round and coaxially aligned with the longitudinal axis of the injector 218, bore 222 and seal 234. The internal diameter of the central aperture of the retention member aperture 236a is greater than the outer radius of the seal collar 244 but less than the outer radius of the main body 240. As such, the main body 242 and retention member 236 radially overlap one another so as to contact one another in the axial direction and prevent movement.

As noted above, the retention member 236 may be generally planar and may comprise an elongate plate-like member. In the example shown in FIG. 1, the retention member 36 extends between all of the injector seals 234 although this is not a requirement and there may be a plurality of discrete retention members. The individual retention members for each of the seals may be linked to the adjacent neighbouring retention member(s) via a bridging portion which, in the described embodiment is a member which extends between opposing edge regions of the individual retention member portions.

To assemble the air intake assembly 10 of FIG. 1, with the seal 34, the injectors 18 may be mounted to the fuel rail 28, specifically the fuel supply conduits 28b. The retention member 36 may then be positioned over the injectors 18 and fixed to the arms 38. Following this, the seals 34 may be positioned over the injectors 18 until they contact the retention member 36. The fuel rail 28 can then be attached to the manifold 14 whilst inserting the injectors 18 into the respective injector bore 22. The positioning of the retention member 36 and seal 34 is such that the seal 34 contacts the sealing surface 250 as the injectors 18 are inserted into position and the fuel rail 28 bolted into place using the fixing brackets 32. Thus, there is provided a simple way of assembling an intake assembly for an engine whilst accounting for manufacturing tolerances and ensuring the injectors 18 and injector bores 22 remain sealed.

It will be appreciated that the seals may be provided on the manifold and the injectors inserted therein during assembly. As such, the seals may not be preassembled on the fuel intake assembly prior to it being mounted to the manifold.

Returning to FIG. 3, there is an alternative example of a fuel injector seal arrangement 300 comprising a seal collar 344 which is provided in sealable contact with the body of the fuel injector 18 so as to prevent moisture and dust ingress. The main body 342 of the seal 334 comprises a radial portion extending away from the collar 344 and fuel injector 18 which transitions into an axially extending portion via a curved portion to a intake runner portion 346 at the terminal edge which provides the seal against the intake runner 14. The wall thickness of the body 342 is substantially uniform with the seal collar 344 comprising an increased axial length to provide the aforementioned resilient structure to avoid deformation when being mounted to the injector 18 and provide an increased sealing surface against the injector 18. The lowermost rim 344 contacts the manifold and comprises an optional taper which is generally conformable to enable a good sealing contact to be achieved.

As can be seen, the seal 334 is received within a recessed annular trough 340 which surrounds the fuel injector bore 22, as previously described.

Figure 4:
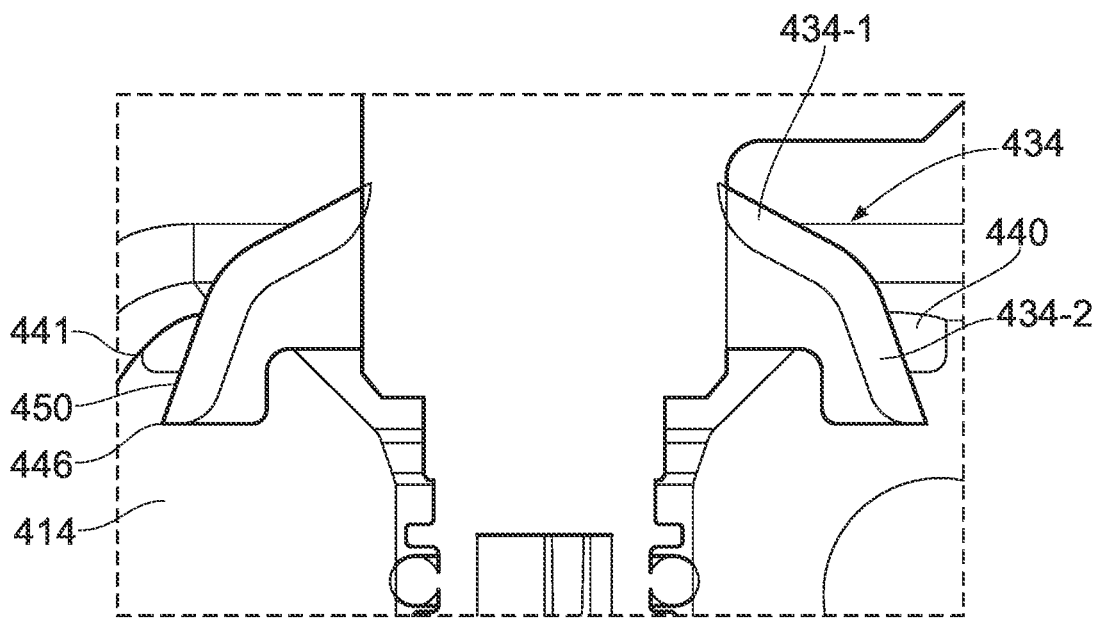
FIG. 4 shows a yet further alternative seal arrangement in section.

FIG. 4 shows a further alternative example of a seal 434 which is similar to that of FIG. 3 with the exception that radial and axial portions are each inclined. Hence, there is provided a seal 434 having two frustoconical sections in which a first section 434-1 having a shallower taper, extends radially and axially from the injector 418 and a second frustoconical section 434-2 with a steeper taper extending from the first section 434-1 to the manifold seal surface 450. In this example, the frustoconical geometry may improve the rigidity in the axial direction which may help to reduce deformation when the seal 434 is inserted into the central aperture. As can be seen, the sealing surfaces of the seal 434 at the injector 418 and intake runner interfaces are tapered in a similar manner to the manifold sealing edge described in connection with FIG. 3. Further, there is no seal collar.

The intake runner 414 comprises an annular recess 440 to receive the edge of the seal 446 and provide the sealing surface. In the embodiment shown, the recess 440 comprises an inner recess in which the seal edge is located and which closely corresponds to the seal profile when in a neutral, non-deformed state/position to increase the sealing contact. As such the sealing surface 450 extends along an edge surface of the main body and onto the extreme edge. The outer recess has a greater diameter and provides a passageway around the seal 434 to the outlet 441 so the water can flow outwards.

FIGS. 5a and 5b show a yet further example in which the seal 534 is retained on the retention member 536 to aid with the assembly of the sealing arrangement. As such, the seal 534 can be mounted to the retention member 536 prior to the insertion of the injector 518 and mounting to the manifold. This can aid with the positioning of the seal 534 in relation to the injector 518.

The coupling of the seal 534 to the retention member 536 is achieved using a groove 552 in the sealing collar 544 which receives an edge of the retention member 536. The collar 544 is sufficiently conformable so as to be deformed when passing through the central aperture of the retention member 536 prior to returning to its original shape once in situ. The groove 552 may be aligned with an upper surface of the seal main body 542 to provide a greater contact area for a planar retention member.

The retention member 536 may be affixed to the fuel rail 28 as shown in FIG. 1, or may be attached directly to the manifold so as to limit the potential for movement. The arrangement in FIGS. 5a and 5b includes an attachment point 554 local to the seal 534. As shown, there is provided a bolt which is received into the manifold adjacent to the seal. Also shown is a bridging portion to connect adjacent retention members of adjacent injectors. As with other embodiments, the may be received within an annular recess as shown.

FIG. 6 provides a seal 634 which comprises a planar disc having a central aperture for receiving and sealing against the injector 618. The intake runner sealing surface is provided on an upper surface of a local elevation in the form of a boss which projects from an external surface of the manifold at the periphery of the bore 622. The sealing surface comprises additional sealing features 658 in the form of a radially distributed series of ribs and grooves which act to improve the sealing contact between the elevation and seal surface.

The radial extent of the seal 634 is such to overhang the boss 656 to help ensure that any run-off from the seal 634 is deposited away from the sealing surface to reduce the potential for fluid ingress.

Figure 7C:
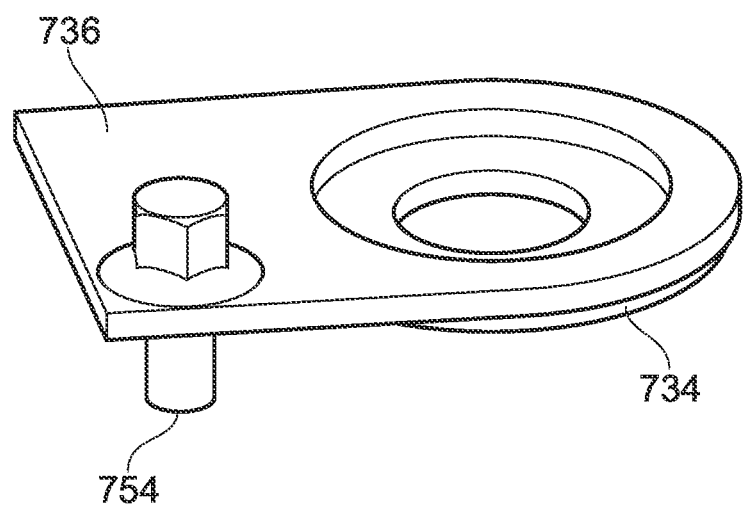

In the embodiment of FIG. 7a to 7c, a seal 734 similar to the seal in FIG. 6 is provided. Common reference numerals incremented by 100 are used herein with common description omitted for brevity.

The seal of FIGS. 7a to 7c is distinguished with the inclusion of a retention member 736 which is clamped down on top of the seal 734 using a mechanical fixing 754 which may be in the form of a bolt, as shown. As with FIG. 6, the sealing surface of the manifold is provided by a local elevation 756 in the form of boss which surrounds the injector bore 722.

The retention member 736, and/or seal 734, may project radially beyond the sealing surface and/or boss so as to direct run-off away from the sealing surface.

The retention member 736 is provided adjacent to the seal 734 so as to provide a suitable clamping of the seal 734. The bolt 754 which attaches the retention member 736 may be received within a local elevation (which may be the same as the boss that provides the sealing surface) or one which is removed from the sealing surface boss. In some embodiments, the retention member 736 may be attached to a nominal surface of the intake runner, i.e. not on a purposely provided boss, or otherwise attached in accordance with the methods disclosed elsewhere herein.

Providing a local fixing point for the retention member 736 is advantageous as it allows the seal 734 to be clamped in place and compressed to provide an improved seal. Hence, as can be seen, the seal 734 may comprise a reduced thickness when compared to the seal 634 in FIG. 6 which does not utilise a retention member.

Figure 8B:
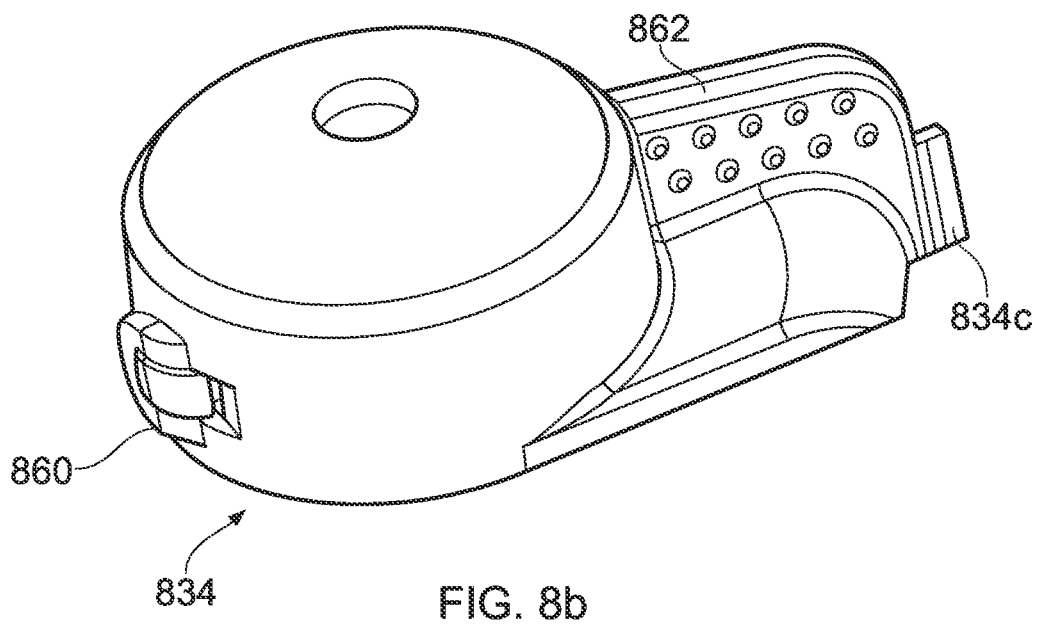

FIGS. 8a and 8b provide a further example of a seal 834 for an injector 818. This seal 834 is distinguished by a two-part construction in which a first part and a second part are clamped together around the injector 818 and latched together to prevent opening. Hence, as shown, there is a first part 834a and a second part 834b which are hingedly connected via a hinge portion 834c. Each of the first 834a and second 834b parts in combination define the aperture for sealing around the injector 818.

Figure 8C:
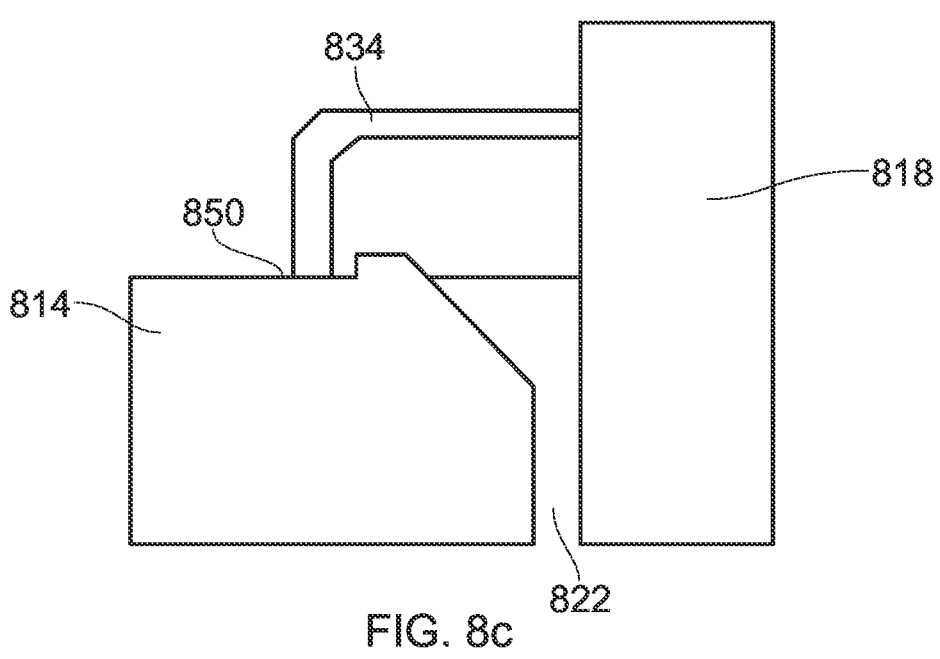

The external profile geometry of the two part seal 834 can be similar to any of the seals described herein. In FIGS. 8a and 8b, the seal 834 comprises a frustoconical geometry having a first shallow taper angle so as to be predominantly radially extending away from the injector and a second steeper taper angle which is predominantly if not exclusively axial. FIG. 8c shows partial section of a seal arrangement having a slight variation in that the radial portion is exclusively radial and the axial portion exclusively axial, thereby providing a capped cylinder.

The sealing surface 850 between the seal 834 and intake runner 814 is provided on a substantially flush surface of the manifold, rather than on a raised boss or in a recess. As shown, the sealing surface may comprise a lip at a radially inner edge of the sealing surface and local to a periphery of the fuel injector bore 822 to prevent a flow of fluid inwards to the bore and to help locate the seal 834.

The two parts 834a, 834b may be attached together using a suitable attachment such as a latch, clasp or clamp. In the embodiment shown, there is a latch 860 which extends between the first 834a and second 834b parts coupling the elements together.

Also shown is a handle portion 862 which extends axially away from the main body. The handle may be configured to allow a user to grasp the seal during the attachment of movement of the seal.

As will be appreciated, an advantage of a two part seal of the type shown in FIGS. 8a-8c is that it can be fitted on to the injector once the injector assembly is mounted to the manifold rather than having it as a part of the pre-assembly.

The mating interface between the first part 834a and second 834b part may comprise a lip which aids the mating of the first and second parts and provides a larger sealing surface to help prevent ingress of dirt and moisture.

The central aperture of the seal 834 which receives the injector may be configured to loosely fit around the injector 818 such that seal is able to sit on top of the manifold and not travel with the injector if the injector moves relative to the manifold in service. This is particularly advantageous for a two part seal which may be more rigid compared to the single piece seals which may be more deformable so as to fit over the injectors. In other embodiments, the aperture may comprise a more conformable material, as a liner for example, so that a tight fit can be provided.

The present disclosure presents inventive concepts relating to fuel injector assemblies and sealing of fuel injectors. The inventive concepts are particularly, though not exclusively, useful for PFI engines where fuel is injected upstream of the cylinder in the air manifold. The inventive concepts are also useful for engines in which an fuel intake system is preassembled and there are potential misalignments with the air intake system, necessitating the need to provide floating injectors. Hence, the use of the seals disclosed herein enables the use of a pre-assembled fuel assembly and the convenience that provides for assembly of the engine and packaging of the various components. The inventive concepts are also particularly useful, though not exclusively, for off-highway sector vehicles where levels of dirt and water are more prolific and problematic.

The one or more embodiments are described above by way of example only and it will be appreciated that variations are possible without departing from the scope of protection afforded by the appended claims.

The invention claimed is:

1. An internal combustion engine comprising:
a plurality of cylinders;
a plurality of fuel injectors configured to inject a fuel into a respective cylinder of the plurality cylinders, wherein the fuel injectors are received within a bore in a body of the engine;
a seal surrounding each injector and extending between each injector and a peripheral region of the bore, wherein the seal is external to the bore, wherein the seal comprises an inverted cup shape; and
a second seal, the second seal between an inner surface of the bore and the injector, the second seal providing a primary seal for providing a gas tight seal for the injector within the bore,
wherein the body comprises one or more sealing features on the periphery of the bore, the sealing features being configured to mate with or abut the seal, and
wherein the sealing feature comprises an annular recess which surrounds the bore, the annular recess having a side wall which surrounds the seal and a base wall which contacts a rim of the seal, wherein the side wall is separated from the seal by a gap.

2. The internal combustion engine of claim 1, wherein the seal comprises a radial portion and an axial portion, the radial portion comprising a central aperture for receiving the injector and the axial portion extends from the radial portion to the body.

3. The internal combustion engine of claim 2, wherein the seal comprises an inverted cup shape.

4. The internal combustion engine of claim 1, wherein the annular recess comprises a drain to allow fluid to exit the recess away from the bore.

5. The internal combustion engine of claim 1, wherein the central aperture which receives the injector is defined by a collar which is configured to resist deformation when being urged over the fuel injector.

6. The internal combustion engine of claim 5, wherein the collar comprises an axial length greater than 3mm and a radial width greater than 2.5 mm.

7. The internal combustion engine of claim 1, wherein the seal is axially and radially resiliently deformable.

8. The internal combustion engine of claim 1, further comprising a retention member configured to limit axial movement of the seal along the injector.

9. The internal combustion engine of claim 8, wherein the retention member abuts an upper surface of the seal.

10. The internal combustion engine of claim 8, wherein the injector passes through the retention member.

11. The internal combustion engine of claim 8, wherein the retention member engages with a plurality of seals.

12. The internal combustion engine of claim 8, wherein the retention member is attached to the engine independently of the seals and injectors.

13. The internal combustion engine of claim 12, wherein the injectors are in flow communication with a rigid fuel rail, wherein the retention member is attached to the fuel rail.

14. The internal combustion engine of claim 1, wherein the seal comprises a seal collar which sealably mates with the injector and a rim which sealably contacts the body and a main body extending therebetween.

15. The internal combustion engine of claim 1, wherein the fuel injector is configured to inject a gaseous fuel, optionally hydrogen.

16. The internal combustion engine of claim 1, wherein the body in which the injector is received comprises an air intake manifold.

17. The internal combustion engine of claim 16 further comprising a fuel rail to which the injectors are mounted, wherein the injectors, fuel rail and seals comprise a subassembly which is mounted to the manifold.

18. An off-highway vehicle comprising an internal combustion engine, the internal engine comprising:
a plurality of cylinders;
a plurality of fuel injectors configured to inject a fuel into a respective cylinder of the plurality cylinders, wherein the fuel injectors are received within a bore in a body of the engine;

a seal surrounding each injector and extending between each injector and a peripheral region of the bore, wherein the seal is external to the bore; and a second seal, the second seal between an inner surface of the bore and the injector, the second seal providing a primary seal for providing a gas tight seal for the injector within the bore, wherein the second seal is an o-ring, wherein the seal comprises an inverted cup shape;

wherein the body comprises one or more sealing features on the periphery of the bore, the sealing features being configured to mate with or abut the seal, and wherein the sealing feature comprises an annular recess which surrounds the bore, the annular recess having a side wall which surrounds the seal and a base wall which contacts a rim of the seal, wherein the side wall is separated from the seal by a gap.

19. The internal combustion engine of claim 1, wherein the annular recess and bore are separated by an annular stub wall which extends axially away from the bore so as to provide a barrier between the rim of the seal and the bore.

20. The internal combustion engine of claim 1, further comprising a second seal, the second seal between an inner surface of the bore and the injector, the second seal providing a primary seal for providing a gas tight seal for the injector within the bore, wherein the second seal is an o-ring.

21. An internal combustion engine comprising:

a plurality of cylinders;

a plurality of fuel injectors configured to inject a fuel into a respective cylinder of the plurality cylinders, wherein the fuel injectors are received within a bore in a body of the engine;

a seal surrounding each injector and extending between each injector and a peripheral region of the bore, wherein the seal is external to the bore, wherein the body comprises one or more sealing features on the periphery of the bore, the sealing features being configured to mate with or abut the seal, wherein the sealing feature comprises an annular recess which surrounds the bore, wherein the annular recess receives a rim of the seal, and, wherein the annular recess and bore are separated by an annular stub wall which extends axially away from the bore so as to provide a barrier between the rim of the seal and the bore.

* * * * *